(12) United States Patent
Clontz

(10) Patent No.: US 11,071,379 B1
(45) Date of Patent: Jul. 27, 2021

(54) FOOTWEAR STORAGE RACK FOR VEHICLE TRUNK

(71) Applicant: Ron Clontz, Greer, SC (US)

(72) Inventor: Ron Clontz, Greer, SC (US)

( * ) Notice: Subject to any disclaimer, the term of this patent is extended or adjusted under 35 U.S.C. 154(b) by 0 days.

(21) Appl. No.: 16/853,849

(22) Filed: Apr. 21, 2020

(51) Int. Cl.
*A47B 61/04* (2006.01)
*B60R 7/02* (2006.01)
*B60R 7/10* (2006.01)
*B60R 11/00* (2006.01)

(52) U.S. Cl.
CPC ........... *A47B 61/04* (2013.01); *B60R 7/02* (2013.01); *B60R 7/10* (2013.01); *B60R 2011/0036* (2013.01); *B60R 2011/0075* (2013.01)

(58) Field of Classification Search
CPC .............. A47B 61/04; B60R 7/02; B60R 7/10
USPC ........................................................ 224/539
See application file for complete search history.

(56) References Cited

U.S. PATENT DOCUMENTS

| | | | | |
|---|---|---|---|---|
| 2,541,702 A * | 2/1951 | Katz | ...................... | B60R 11/06 224/542 |
| 2,937,728 A * | 5/1960 | Koffler | ...................... | A45C 3/12 190/110 |
| 3,279,102 A * | 10/1966 | Seeber, Sr. | ............ | A43B 19/005 36/7.5 |
| 3,563,390 A * | 2/1971 | Kim | ...................... | A47B 61/04 211/35 |
| 4,456,316 A * | 6/1984 | Lundgren | .............. | A47B 61/04 312/229 |
| D283,472 S | 4/1986 | Wattles | | |
| D312,604 S | 12/1990 | Barnes | | |
| 5,104,208 A * | 4/1992 | Gesing | .................... | A47B 61/04 312/321.5 |
| 5,170,892 A * | 12/1992 | Fromkin | ................. | A47B 47/00 211/184 |
| 5,469,999 A * | 11/1995 | Phirippidis | ................ | B60R 5/04 220/23.4 |
| 6,030,059 A | 2/2000 | Stravitz | | |
| 6,149,040 A | 11/2000 | Walker | | |
| 6,386,610 B1 | 5/2002 | Butzke | | |
| 8,444,198 B2 * | 5/2013 | Pauken | ...................... | B60R 7/02 296/37.7 |
| 8,657,391 B2 * | 2/2014 | Simondi | .................... | A47F 7/26 312/234.1 |

(Continued)

FOREIGN PATENT DOCUMENTS

CA     2830512     9/2012

*Primary Examiner* — Nathan J Newhouse
*Assistant Examiner* — Lester L Vanterpool
(74) *Attorney, Agent, or Firm* — Kyle A. Fletcher, Esq.

(57) ABSTRACT

The footwear storage for a vehicle trunk is a mechanical structure. The footwear storage for a vehicle trunk is configured for use in storing footwear and other articles. The footwear storage for a vehicle trunk is contained in the trunk of the automobile. The footwear storage for a vehicle trunk is formed with a cant. The cant forms an angle between the supporting storage surfaces formed by the footwear storage for a vehicle trunk and the force of gravity. The cant is selected such that objects will not slide out of the footwear storage for a vehicle trunk during the acceleration and deceleration of the vehicle. The footwear storage for a vehicle trunk comprises a master pan, a plurality of footwear pocket structures, and a storage pan. Each of the plurality of footwear pocket structures mount on the master pan. The storage pan is contained within the master pan.

18 Claims, 4 Drawing Sheets

(56) References Cited

U.S. PATENT DOCUMENTS

| | | | |
|---|---|---|---|
| 9,480,356 B2* | 11/2016 | Afolabi | A47G 25/84 |
| 9,943,166 B1* | 4/2018 | Cleary | A47B 43/00 |
| 10,118,561 B2 | 11/2018 | James-Moore | |
| 10,531,735 B1* | 1/2020 | Lucio | A47B 57/04 |
| 2003/0111434 A1* | 6/2003 | Stoddart | A47B 43/00 |
| | | | 211/118 |
| 2004/0178155 A1* | 9/2004 | Brownfield | A47F 7/08 |
| | | | 211/36 |
| 2005/0205499 A1 | 9/2005 | Botner | |
| 2005/0252869 A1* | 11/2005 | Graham | A47F 7/08 |
| | | | 211/36 |
| 2007/0090062 A1* | 4/2007 | Girault | A45C 3/12 |
| | | | 211/36 |
| 2009/0039747 A1* | 2/2009 | Webster, II | A47B 61/04 |
| | | | 312/334.1 |
| 2012/0098396 A1* | 4/2012 | Schinzing | A47B 57/00 |
| | | | 312/245 |
| 2018/0132612 A1 | 5/2018 | Felsenthal | |
| 2019/0084485 A1* | 3/2019 | Rivas Franco | B60R 7/02 |

* cited by examiner

FOOTWEAR STORAGE RACK FOR VEHICLE TRUNK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles, more specifically, a storage appliance mounted inside a vehicle intended for storing personal property smaller than a suitcase. (B60R7/02)

SUMMARY OF INVENTION

The footwear storage for a vehicle trunk is a mechanical structure. The footwear storage for a vehicle trunk is configured for use in storing footwear, garments, and domestic articles. The footwear storage for a vehicle trunk is configured for use with an automobile. The footwear storage for a vehicle trunk is contained in the trunk of the automobile. The footwear storage for a vehicle trunk is formed with a cant. The cant forms an angle between the supporting storage surfaces formed by the footwear storage for a vehicle trunk and the force of gravity. The cant is selected such that objects will not slide out of the footwear storage for a vehicle trunk during the acceleration and deceleration of the vehicle. The footwear storage for a vehicle trunk comprises a master pan, a plurality of footwear pocket structures, and a storage pan. Each of the plurality of footwear pocket structures mount on the master pan. The storage pan is contained within the master pan.

These together with additional objects, features and advantages of the footwear storage for a vehicle trunk will be readily apparent to those of ordinary skill in the art upon reading the following detailed description of the presently preferred, but nonetheless illustrative, embodiments when taken in conjunction with the accompanying drawings.

In this respect, before explaining the current embodiments of the footwear storage for a vehicle trunk in detail, it is to be understood that the footwear storage for a vehicle trunk is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the footwear storage for a vehicle trunk.

It is therefore important that the claims be regarded as including such equivalent construction insofar as they do not depart from the spirit and scope of the footwear storage for a vehicle trunk. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
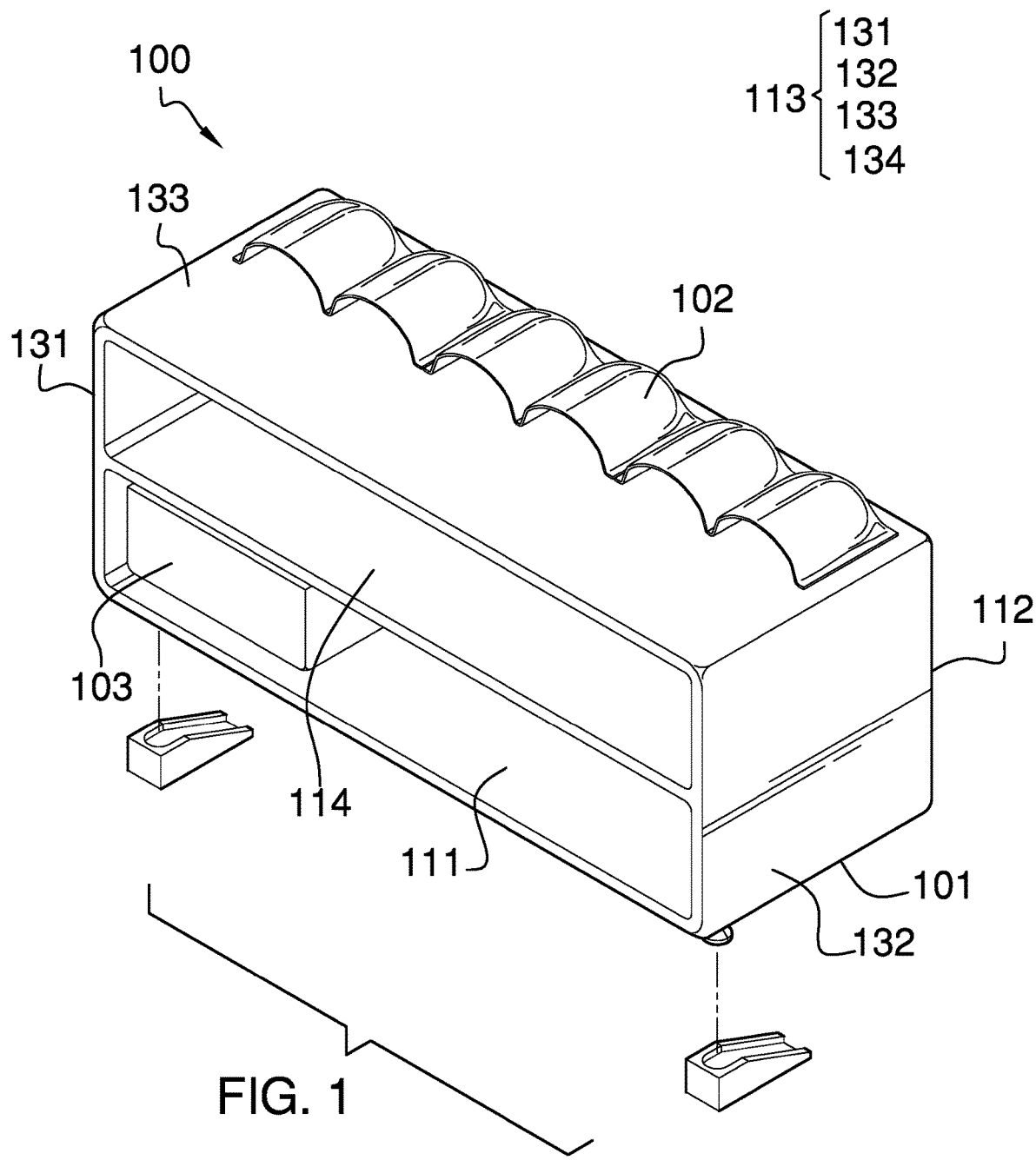
FIG. 1 is a perspective view of an embodiment of the disclosure.
Figure 2:
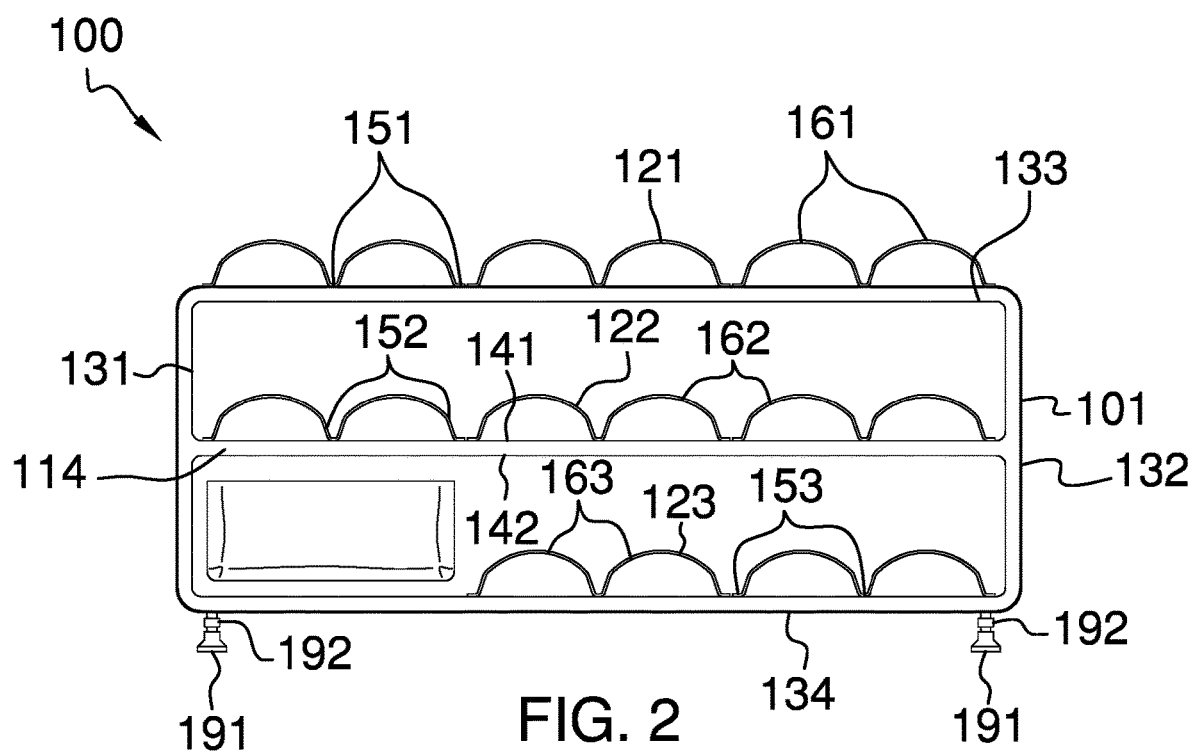
FIG. 2 is a front view of an embodiment of the disclosure.
Figure 3:
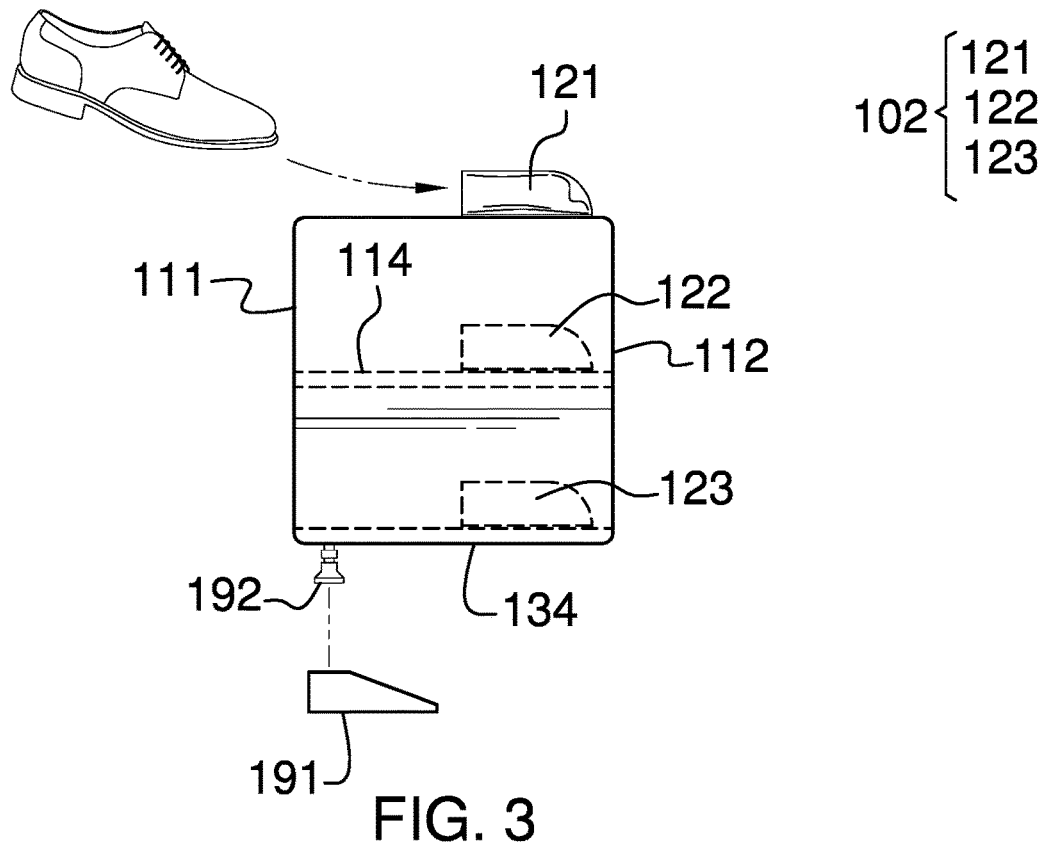
FIG. 3 is a side view of an embodiment of the disclosure.
Figure 4:
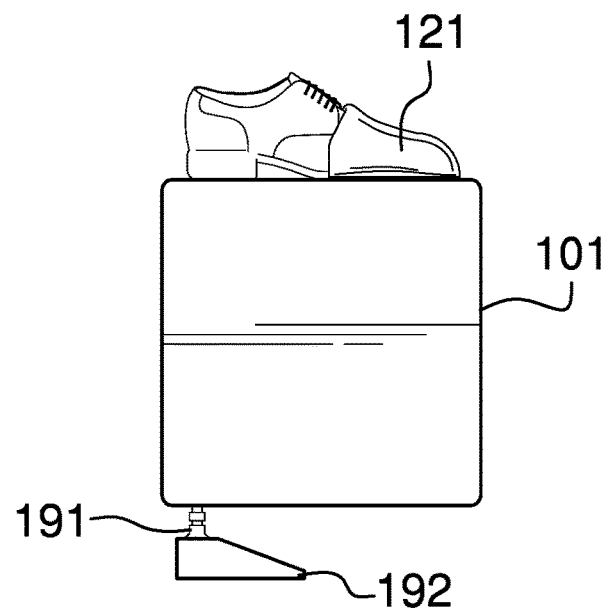
FIG. 4 is a detail view of an embodiment of the disclosure.
Figure 5:
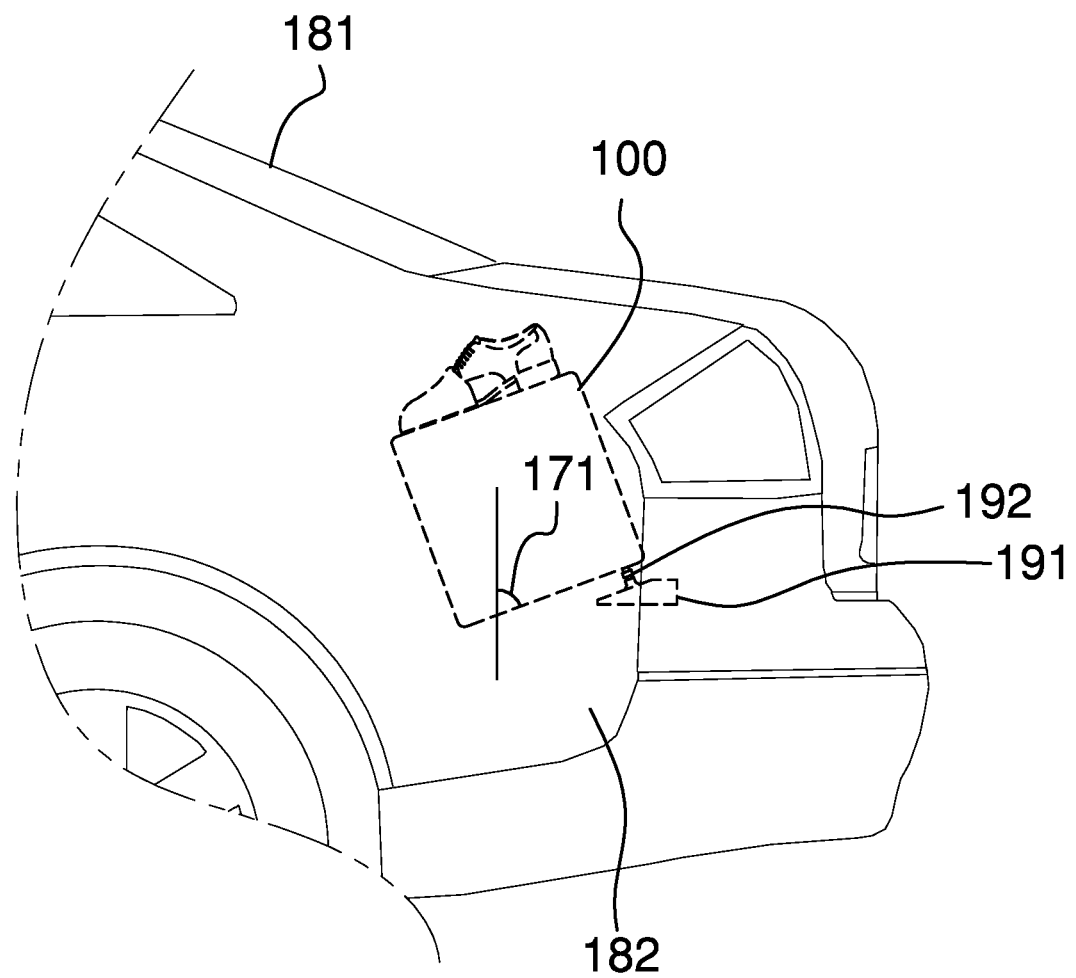
FIG. 5 is an in-use view of an embodiment of the disclosure.

Detailed reference will now be made to one or more potential embodiments of the disclosure, which are illustrated in FIGS. 1 through 5.

Detailed reference will now be made to one or more potential embodiments of the disclosure, which are illustrated in FIGS. 1 through 5.

The footwear storage for a vehicle trunk 100 (hereinafter invention) is a mechanical structure. The invention 100 is configured for use in storing footwear, garments, and domestic articles. The invention 100 is configured for use with an automobile 181. The invention 100 is contained in the trunk 182 of the automobile 181. The invention 100 is formed with a cant 171. The cant 171 forms an angle between the supporting storage surfaces formed by the invention 100 and the force of gravity. The cant 171 is selected such that objects will not slide out of the invention 100 during the acceleration and deceleration of the vehicle. The invention 100 comprises a master pan 101, a plurality of footwear pocket structures 102, and a storage pan 103. Each of the plurality of footwear pocket structures 102 mount on the master pan 101. The storage pan 103 is contained within the master pan 101.

The automobile 181 is defined elsewhere in this disclosure. The trunk 182 is defined elsewhere in this disclosure.

The master pan 101 is a prism-shaped structure. The master pan 101 is a hollow structure. The master pan 101 has a pan shape. The master pan 101 forms the primary shape of the invention 100. The master pan 101 comprises an open face 111, a closed face 112, a plurality of lateral faces 113, and a dividing plate 114.

The open face 111 is a congruent end of the prism structure of the master pan 101. The open face 111 is the open face 111 of the pan structure of the master pan 101. The items stored within the master pan 101 are placed into the master pan 101 through the open face 111.

The closed face 112 is a congruent end of the prism structure of the master pan 101. The closed face 112 is a closed face 112 of the pan structure of the master pan 101. The closed face 112 is the surface of the master pan 101 that is distal from the open face 111.

Each of the plurality of lateral faces 113 forms portion of the lateral face structure of the master pan 101. Each of the plurality of lateral faces 113 is perpendicular to the open face 111. Each of the plurality of lateral faces 113 is perpendicular to the closed face 112. Each of the plurality of lateral faces 113 enclose a portion of the open face 111. Each of the plurality of lateral faces 113 forms a containment surface that runs from the open face 111 to the closed face 112. The plurality of lateral faces 113 comprises a first lateral face 131, a second lateral face 132, a superior lateral face 133, and an inferior lateral face 134.

The first lateral face 131 is a lateral face selected from the plurality of lateral faces 113. The first lateral face 131 forms a solid portion of the containment structure formed by the pan structure of the master pan 101. The interior surface formed by the first lateral face 131 is perpendicular to the open face 111. The interior surface formed by the first lateral face 131 is perpendicular to the closed face 112.

The second lateral face 132 is a lateral face selected from the plurality of lateral faces 113. The second lateral face 132 forms a solid portion of the containment structure formed by the pan structure of the master pan 101. The interior surface formed by the second lateral face 132 is perpendicular to the open face 111. The interior surface formed by the second lateral face 132 is perpendicular to the closed face 112. The second lateral face 132 is the lateral face selected from the plurality of lateral faces 113 that is distal from the first lateral face 131.

The superior lateral face 133 is a lateral face selected from the plurality of lateral faces 113. The superior lateral face 133 forms the superior structure of the pan structure of the master pan 101. The superior lateral face 133 attaches to the first lateral face 131. The superior lateral face 133 attaches to the second lateral face 132. The interior surface formed by the superior lateral face 133 is perpendicular to the first lateral face 131. The interior surface formed by the superior lateral face 133 is perpendicular to the second lateral face 132.

The inferior lateral face 134 is a lateral face selected from the plurality of lateral faces 113. The inferior lateral face 134 forms the inferior structure of the pan structure of the plurality of lateral faces 113 of the master pan 101. The inferior lateral face 134 attaches to the first lateral face 131. The inferior lateral face 134 attaches to the second lateral face 132. The interior surface formed by the inferior lateral face 134 is perpendicular to the first lateral face 131. The interior surface formed by the inferior lateral face 134 is perpendicular to the second lateral face 132. The inferior lateral face 134 is the lateral face selected from the plurality of lateral faces 113 that is distal from the superior lateral face 133. The inferior lateral face 134 further comprises a plurality of wedges 191, a plurality of footings 192, and a cant 171.

Each of the plurality of footings 192 is a footing structure. Each of the plurality of footings 192 attaches to the exterior surface of the inferior lateral face 134. Each of the plurality of footings 192 transfers a portion of the load path of the invention 100 to the supporting surface formed by a wedge selected from the plurality of wedges 191. Each of the plurality of footings 192 elevates a section of the inferior lateral face 134 above the supporting surface of the trunk 182 of the automobile 181 to form the cant 171.

Each of the plurality of wedges 191 is a tapered prism structure. The tapered prism structure is defined elsewhere in this disclosure. Each of the plurality of wedges 191 is a wedge. The wedge is defined elsewhere in this disclosure. Each of the plurality of wedges 191 is placed on the supporting surface of the trunk 182 of the automobile 181 to form an inclined planar surface.

Each footing selected from the plurality of footings 192 attaches to the superior surface of a wedge selected from the plurality of wedges 191. The attachment location of the selected footing to its selected wedge determines the elevation of the inferior lateral face 134 relative to the supporting surface of the trunk 182 of the automobile 181.

By using the plurality of wedges 191 and the plurality of footings 192 to elevate a portion of the inferior lateral face 134, a cant 171 is formed between the inferior face of the inferior lateral face 134 and the force of gravity. The cant 171 prevents objects secured by the invention 100 form sliding out of the invention 100 during the acceleration and the deceleration of the automobile 181. The cant 171 is defined elsewhere in this disclosure.

The dividing plate 114 is a prism-shaped structure. The dividing plate 114 is a disk-shaped structure. The dividing plate 114 removably installs in the hollow interior of the master pan 101 such that the congruent ends of the disk structure of the dividing plate 114 are parallel to the open face 111 and the closed face 112 of the pan structure of the master pan 101. The dividing plate 114 forms a removable shelf that elevates stored objects to an elevation between the superior lateral face 133 and the inferior lateral face 134 of the plurality of lateral faces 113 of the master pan 101. The dividing plate 114 comprises a superior congruent end 141 and an inferior congruent end 142.

The superior congruent end 141 is the congruent end of the disk structure of the dividing plate 114 that is proximal to the superior lateral face 133 when the dividing plate 114 is installed in the master pan 101. The inferior congruent end 142 is the congruent end of the disk structure of the dividing plate 114 that is proximal to the inferior lateral face 134 when the dividing plate 114 is installed in the master pan 101. The inferior congruent end 142 is the face of the disk structure of the dividing plate 114 that is distal from the superior congruent end 141 of the dividing plate 114.

One or more footwear pocket structures selected from the plurality of footwear pocket structures 102 attach to the exterior surfaces of the master pan 101. One or more footwear pocket structures selected from the plurality of footwear pocket structures 102 attach to the interior structures of the master pan 101. Each of the plurality of footwear pocket structures 102 is a sheeting based structure. Each of the plurality of footwear pocket structures 102 attaches to a surface formed by the master pan 101. The plurality of footwear pocket structures 102 comprises a first footwear pocket structure 121, a second footwear pocket structure 122, and a third footwear pocket structure 123.

The first footwear pocket structure 121 is a mechanical structure. The first footwear pocket structure 121 is formed from a sheeting. The first footwear pocket structure 121 is configured to store a plurality of footwear items. The first footwear pocket structure 121 attaches to the exterior surface of the superior lateral face 133 of the pan structure of the master pan 101. The first footwear pocket structure 121 comprises a first plurality of seams 151 and a first plurality of shoe pockets 161.

The first plurality of seams 151 comprises a collection of adhesive seams used to secure portions of the first footwear pocket structure 121 to the exterior surface of the superior lateral face 133 of the master pan 101. The sheeting structure of the first footwear pocket structure 121 is folded to form a curved structure such that the attachment of the first footwear pocket structure 121 to the superior lateral face 133 by the first plurality of seams 151 forms the first plurality of shoe pockets 161.

The first plurality of shoe pockets 161 forms a containment structure. Each footwear pocket structure is folded from the sheeting structure that forms the first footwear pocket structure 121. A seam selected from the first plurality of seams 151 segregates a first selected footwear pocket structure selected from the first plurality of shoe pockets 161 from a second selected footwear pocket structure selected from the first plurality of shoe pockets 161. Each of the first plurality of shoe pockets 161 is sized to receive and store an item of footwear.

The second footwear pocket structure 122 is a mechanical structure. The second footwear pocket structure 122 is formed from a sheeting. The second footwear pocket structure 122 is configured to store a plurality of footwear items. The second footwear pocket structure 122 attaches to the superior congruent end 141 of the disk structure of the dividing plate 114 of the master pan 101. The second footwear pocket structure 122 comprises a second plurality of seams 152 and a second plurality of shoe pockets 162.

The second plurality of seams 152 comprises a collection of adhesive seams used to secure portions of the second footwear pocket structure 122 to the superior congruent end 141 of the dividing plate 114 of the master pan 101. The sheeting structure of the second footwear pocket structure 122 is folded to form a curved structure such that the attachment of the second footwear pocket structure 122 to the superior lateral face 133 by the second plurality of seams 152 forms the second plurality of shoe pockets 162.

The second plurality of shoe pockets 162 forms a containment structure. Each footwear pocket structure is folded from the sheeting structure that forms the second footwear pocket structure 122. A seam selected from the second plurality of seams 152 segregates a third selected footwear pocket structure selected from the second plurality of shoe pockets 162 from a fourth selected footwear pocket structure selected from the second plurality of shoe pockets 162. Each of the second plurality of shoe pockets 162 is sized to receive and store an item of footwear.

The third footwear pocket structure 123 is a mechanical structure. The third footwear pocket structure 123 is formed from a sheeting. The third footwear pocket structure 123 is configured to store a plurality of footwear items. The third footwear pocket structure 123 attaches to the interior surface of the inferior lateral face 134 of the pan structure of the master pan 101. The third footwear pocket structure 123 comprises a third plurality of seams 153 and a third plurality of shoe pockets 163.

The third plurality of seams 153 comprises a collection of adhesive seams used to secure portions of the third footwear pocket structure 123 to the inferior surface of the inferior lateral face 134 of the master pan 101. The sheeting structure of the third footwear pocket structure 123 is folded to form a curved structure such that the attachment of the third footwear pocket structure 123 to the inferior lateral face 134 by the third plurality of seams 153 forms the third plurality of shoe pockets 163.

The third plurality of shoe pockets 163 forms a containment structure. Each footwear pocket structure is folded from the sheeting structure that forms the third footwear pocket structure 123. A seam selected from the third plurality of seams 153 segregates a fifth selected footwear pocket structure selected from the third plurality of shoe pockets 163 from a sixth selected footwear pocket structure selected from the third plurality of shoe pockets 163. Each of the third plurality of shoe pockets 163 is sized to receive and store an item of footwear.

The storage pan 103 forms a containment structure that removably inserts into the interior of the master pan 101. The storage pan 103 is a prism-shaped structure. The storage pan 103 is a hollow structure. The storage pan 103 has a pan shape. The storage pan 103 is configured to store one or more domestic articles.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Automobile: As used in this disclosure, an automobile is a road vehicle that specializes in carrying passengers and light cargo loads. This definition is specifically intended to include vehicles generally referred to as pickup trucks, vans, minivans, and sport utility vehicles. The automobile further comprises an electrical system. The automobile is often defined with a trunk. The trunk is an enclosed storage chamber formed within the automobile.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Domestic Article: As used in this disclosure, a domestic article is an item or object: 1) that is commonly found within a household; or, 2) that is commonly carried or worn by a person. Examples of domestic articles include, but are not limited to, clothing, keys and key fobs, personal data devices, glasses, remote controls, or personal storage items such as purses, briefcases, wallets, or cases.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Footing: As used in this disclosure, a footing refers to one of a plurality of small pedestals that combine to: a) raise an object above a supporting surface; and, b) transfer the load path of the object to the supporting surface.

Footwear: As used in this disclosure, footwear refers to a protective structure that is worn on a foot. Footwear is commonly referred to as a shoe.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Garment: As used in this disclosure, a garment is a textile based structure that is used to cover an individual. Clothes, clothing, and apparel are synonyms for garment.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Incline: As used in this disclosure, the term inclines is a term that refers to a cant that is formed between a first line or surface and a reference line or surface. The line or surface that is not the reference line or surface is the "inclined" line or surface.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to the longest edge of a rectangular structure.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan. A semi-enclosed pan refers to a pan wherein the closed end of prism structure of the pan and/or a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Pocket: As used in this disclosure, a pocket is a small pouch or storage space that is formed on or into an object. Pockets are often formed by joining a second textile or a second sheeting to a first textile or a first sheeting, respectively, by sewing or heat sealing respectively. Methods to form pockets are well-known and documented in the textile and apparel arts.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, a laser seam, or a seam formed using an adhesive.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Shelf: As used in this disclosure, a shelf is a horizontal surface that supports one or more objects at an elevated position.

Slide: As used in this disclosure, slide is a verb that refers to an object that is transported along a surface while in continuous contact with the surface. An object being transported along a surface with wheels cannot be said to be sliding.

Superior: As used in this disclosure, the term superior refers to a directional reference that is parallel to and in the opposite direction of the force of gravity when an object is positioned or used normally.

Taper: As used in this disclosure, a taper is a continuous and typically, but not necessarily gradual, change in the span of the length of a structure in the direction parallel a direction selected from the group selected from the major axis and the minor axis of the structure. The change in the span of the length occurs as an apparent function of the measurement position along the unselected axis of the object.

Tapered Prism Structure: As used in this disclosure, a tapered prism structure is a modified prism structure that is formed such that the first congruent end of the modified prism structure is geometrically similar to, but not geometrically identical to the second congruent end of the modified prism. The span of the length of a radial line from the center axis to the lateral face of the modified prism structure will vary as a function of its position along the center axis.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wedge: As used in this disclosure, a wedge is a modification to a prism-shaped structure wherein: a) the span of the distance of the diameter varies continuously as a function of the position of the center axis of the prism; and, b) the two congruent ends of the prism structure remain geometrically similar. A blade is a wedge-like structure that ultimately forms a cutting edge. This disclosure considers a wedge to be a type of tapered prism structure.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A footwear storage for a vehicle trunk comprising a master pan, a plurality of footwear pocket structures, and a storage pan;
    wherein each of the plurality of footwear pocket structures mount on the master pan;
    wherein the storage pan is contained within the master pan;
    wherein the footwear storage for a vehicle trunk is configured for use with an automobile;
    wherein the footwear storage for a vehicle trunk is contained in the trunk of the automobile;
    wherein the footwear storage for a vehicle trunk is configured for use in storing footwear, garments, and domestic articles;
    wherein the master pan comprises an open face, a closed face, a plurality of lateral faces, and a dividing plate;
    wherein the plurality of lateral faces comprises a first lateral face, a second lateral face, a superior lateral face, and an inferior lateral face;
    wherein the first lateral face forms a solid portion of the containment structure formed by the pan structure of the master pan;
    wherein the second lateral face forms a solid portion of the containment structure formed by the pan structure of the master pan;
    wherein the superior lateral face forms the superior structure of the pan structure of the master pan;
    wherein the inferior lateral face forms the inferior structure of the pan structure of the plurality of lateral faces of the master pan;
    wherein the inferior lateral face further comprises a plurality of wedges, a plurality of footings, and a cant;
    wherein each footing selected from the plurality of footings attaches to the superior surface of a wedge selected from the plurality of wedges.

2. The footwear storage for a vehicle trunk according to claim 1
    wherein the footwear storage for a vehicle trunk is formed with a cant;

wherein the cant forms an angle between the supporting storage surfaces formed by the footwear storage for a vehicle trunk and the force of gravity.

3. The footwear storage for a vehicle trunk according to claim 2
wherein the master pan is a prism-shaped structure;
wherein the master pan is a hollow structure;
wherein the master pan has a pan shape.

4. The footwear storage for a vehicle trunk according to claim 3
wherein one or more footwear pocket structures selected from the plurality of footwear pocket structures attach to the exterior surfaces of the master pan;
wherein one or more footwear pocket structures selected from the plurality of footwear pocket structures attach to the interior structures of the master pan;
wherein each of the plurality of footwear pocket structures is a sheeting based structure;
wherein each of the plurality of footwear pocket structures attaches to a surface formed by the master pan.

5. The footwear storage for a vehicle trunk according to claim 4
wherein one or more footwear pocket structures selected from the plurality of footwear pocket structures attach to the exterior surfaces of the master pan;
wherein one or more footwear pocket structures selected from the plurality of footwear pocket structures attach to the interior structures of the master pan;
wherein each of the plurality of footwear pocket structures is a sheeting based structure;
wherein each of the plurality of footwear pocket structures attaches to a surface formed by the master pan.

6. The footwear storage for a vehicle trunk according to claim 5
wherein the storage pan forms containment structure that removably inserts into the interior of the master pan;
wherein the storage pan is a prism-shaped structure;
wherein the storage pan is a hollow structure;
wherein the storage pan has a pan shape.

7. The footwear storage for a vehicle trunk according to claim 6
wherein the open face is a congruent end of the prism structure of the master pan;
wherein the open face is the open face of the pan structure of the master pan;
wherein the items stored within the master pan are placed into the master pan through the open face;
wherein the closed face is a congruent end of the prism structure of the master pan;
wherein the closed face is a closed face of the pan structure of the master pan;
wherein the closed face is the surface of the master pan that is distal from the open face;
wherein each of the plurality of lateral faces forms portion of the lateral face structure of the master pan;
wherein each of the plurality of lateral faces is perpendicular to the open face;
wherein each of the plurality of lateral faces is perpendicular to the closed face;
wherein each of the plurality of lateral faces encloses a portion of the open face;
wherein each of the plurality of lateral faces forms a containment surface that runs from the open face to the closed face.

8. The footwear storage for a vehicle trunk according to claim 7 wherein the plurality of footwear pocket structures comprises a first footwear pocket structure, a second footwear pocket structure, and a third footwear pocket structure;
wherein the first footwear pocket structure is a mechanical structure;
wherein the first footwear pocket structure is formed from a sheeting;
wherein the second footwear pocket structure is a mechanical structure;
wherein the second footwear pocket structure is formed from a sheeting;
wherein the third footwear pocket structure is a mechanical structure;
wherein the third footwear pocket structure is formed from a sheeting.

9. The footwear storage for a vehicle trunk according to claim 8
wherein the first lateral face is a lateral face selected from the plurality of lateral faces;
wherein the interior surface formed by the first lateral face is perpendicular to the open face;
wherein the interior surface formed by the first lateral face is perpendicular to the closed face;
wherein the second lateral face is a lateral face selected from the plurality of lateral faces;
wherein the interior surface formed by the second lateral face is perpendicular to the open face;
wherein the interior surface formed by the second lateral face is perpendicular to the closed face;
wherein the second lateral face is the lateral face selected from the plurality of lateral faces that is distal from the first lateral face.

10. The footwear storage for a vehicle trunk according to claim 9
wherein the superior lateral face is a lateral face selected from the plurality of lateral faces;
wherein the superior lateral face attaches to the first lateral face;
wherein the superior lateral face attaches to the second lateral face;
wherein the interior surface formed by the superior lateral face is perpendicular to the first lateral face;
wherein the interior surface formed by the superior lateral face is perpendicular to the second lateral face;
wherein the inferior lateral face is a lateral face selected from the plurality of lateral faces.

11. The footwear storage for a vehicle trunk according to claim 10
wherein the inferior lateral face attaches to the first lateral face;
wherein the inferior lateral face attaches to the second lateral face;
wherein the interior surface formed by the inferior lateral face is perpendicular to the first lateral face;
wherein the interior surface formed by the inferior lateral face is perpendicular to the second lateral face;
wherein the inferior lateral face is the lateral face selected from the plurality of lateral faces that is distal from the superior lateral face.

12. The footwear storage for a vehicle trunk according to claim 11
wherein each of the plurality of footings transfers a portion of the load path of the footwear storage for a vehicle trunk to the supporting surface formed by a wedge selected from the plurality of wedges;
wherein each of the plurality of footings elevates a section of the inferior lateral face above the supporting surface of the trunk of the automobile to form a cant;

wherein the attachment location of the selected footing to its selected wedge determines the elevation of the inferior lateral face relative to the supporting surface of the trunk of the automobile.

13. The footwear storage for a vehicle trunk according to claim 12
wherein each of the plurality of footings is a footing structure;
wherein each of the plurality of footings attaches to the exterior surface of the inferior lateral face;
wherein each of the plurality of wedges is a tapered prism structure;
wherein each of the plurality of wedges is a wedge;
wherein the wedge is defined elsewhere in this disclosure;
wherein each of the plurality of wedges is placed on the supporting surface of the trunk of the automobile to form an inclined planar surface;
wherein by using the plurality of wedges and the plurality of footings to elevate a portion of the inferior lateral face, a cant is formed between the inferior face of the inferior lateral face and the force of gravity.

14. The footwear storage for a vehicle trunk according to claim 13
wherein the dividing plate is a prism-shaped structure;
wherein the dividing plate is a disk-shaped structure;
wherein the dividing plate removably installs in the hollow interior of the master pan such that the congruent ends of the disk structure of the dividing plate are parallel to the open face and the closed face of the pan structure of the master pan;
wherein the dividing plate forms a removable shelf that elevates stored objects to an elevation between the superior lateral face and the inferior lateral face of the plurality of lateral faces of the master pan.

15. The footwear storage for a vehicle trunk according to claim 14
wherein the dividing plate comprises a superior congruent end and an inferior congruent end;
wherein the superior congruent end is the congruent end of the disk structure of the dividing plate that is proximal to the superior lateral face when the dividing plate is installed in the master pan;
wherein the inferior congruent end is the congruent end of the disk structure of the dividing plate that is proximal to the inferior lateral face when the dividing plate is installed in the master pan;
wherein the inferior congruent end is the face of the disk structure of the dividing plate that is distal from the superior congruent end of the dividing plate.

16. The footwear storage for a vehicle trunk according to claim 15
wherein the first footwear pocket structure is configured to store a plurality of footwear items;
wherein the first footwear pocket structure attaches to the exterior surface of the superior lateral face of the pan structure of the master pan;
wherein the first footwear pocket structure comprises a first plurality of seams and a first plurality of shoe pockets;
wherein the first plurality of seams comprises a collection of adhesive seams used to secure portions of the first footwear pocket structure to the exterior surface of the superior lateral face of the master pan;
wherein the sheeting structure of the first footwear pocket structure is folded to form a curved structure such that the attachment of the first footwear pocket structure to the superior lateral face by the first plurality of seams forms the first plurality of shoe pockets;
wherein the first plurality of shoe pockets forms a containment structure;
wherein each footwear pocket structure is folded from the sheeting structure that forms the first footwear pocket structure;
wherein a seam selected from the first plurality of seams segregates a first selected footwear pocket structure selected from the first plurality of shoe pockets from a second selected footwear pocket structure selected from the first plurality of shoe pockets.

17. The footwear storage for a vehicle trunk according to claim 16
wherein the second footwear pocket structure is configured to store a plurality of footwear items;
wherein the second footwear pocket structure attaches to the superior congruent end of the disk structure of the dividing plate of the master pan;
wherein the second footwear pocket structure comprises a second plurality of seams and a second plurality of shoe pockets;
wherein the second plurality of seams comprises a collection of adhesive seams used to secure portions of the second footwear pocket structure to the superior congruent end of the dividing plate of the master pan;
wherein the sheeting structure of the second footwear pocket structure is folded to form a curved structure such that the attachment of the second footwear pocket structure to the superior lateral face by the second plurality of seams forms the second plurality of shoe pockets;
wherein the second plurality of shoe pockets forms a containment structure;
wherein each footwear pocket structure is folded from the sheeting structure that forms the second footwear pocket structure;
wherein a seam selected from the second plurality of seams segregates a third selected footwear pocket structure selected from the second plurality of shoe pockets from a fourth selected footwear pocket structure selected from the second plurality of shoe pockets.

18. The footwear storage for a vehicle trunk according to claim 17
wherein the third footwear pocket structure is configured to store a plurality of footwear items;
wherein the third footwear pocket structure attaches to the interior surface of the inferior lateral face of the pan structure of the master pan;
wherein the third footwear pocket structure comprises a third plurality of seams and a third plurality of shoe pockets;
wherein the third plurality of seams comprises a collection of adhesive seams used to secure portions of the third footwear pocket structure to the inferior surface of the inferior lateral face of the master pan;
wherein the sheeting structure of the third footwear pocket structure is folded to form a curved structure such that the attachment of the third footwear pocket structure to the inferior lateral face by the third plurality of seams forms the third plurality of shoe pockets;
wherein the third plurality of shoe pockets forms a containment structure;
wherein each footwear pocket structure is folded from the sheeting structure that forms the third footwear pocket structure;

wherein a seam selected from the third plurality of seams segregates a fifth selected footwear pocket structure selected from the third plurality of shoe pockets from a sixth selected footwear pocket structure selected from the third plurality of shoe pockets.

\* \* \* \* \*